United States Patent [19]
Ohta et al.

[11] Patent Number: 5,579,121
[45] Date of Patent: Nov. 26, 1996

[54] REAL-TIME IMAGE COMPRESSION PROCESSOR

[75] Inventors: Minemasa Ohta; Hiroaki Watanabe; Naoto Itoh, all of Nakakoma-gun, Japan

[73] Assignees: Pioneer Video Corporation, Yamanashi; Pioneer Electronic Corporation, Tokyo, both, Japan

[21] Appl. No.: 357,013

[22] Filed: Dec. 16, 1994

[30] Foreign Application Priority Data

Dec. 16, 1993 [JP] Japan .................................. 5-316938

[51] Int. Cl.$^6$ ............................. H04N 7/26; H04N 5/76
[52] U.S. Cl. .................... 386/109; 360/8; 348/390; 348/403; 348/420; 386/112; 386/113; 386/116
[58] Field of Search ................................ 358/335, 310; 360/33.1, 8, 9.1; 348/403, 404, 405, 419, 420, 390; H04N 5/76, 7/32, 7/26

[56] References Cited

U.S. PATENT DOCUMENTS

| | | | |
|---|---|---|---|
| 4,920,426 | 4/1990 | Hatori et al. | 348/405 |
| 5,237,424 | 8/1993 | Nishino et al. | 358/310 |
| 5,426,463 | 6/1995 | Reininger et al. | 348/405 |

*Primary Examiner*—Tommy P. Chin
*Assistant Examiner*—Khoi Truong
*Attorney, Agent, or Firm*—Sughrue, Mion, Zinn, Macpeak & Seas

[57] ABSTRACT

A real-time image compression processor records on a CD or other recording media a compressed video signal which is compressively processed in a high recording efficiency at real-time as being reproduced by a VTR while preventing the image quality from being degraded. There are provided a first encoder for compressively encoding the video signal, and a second encoder for compressively encoding the signal obtainable by delaying such video signal for a given period of time. A parameter adjustment is executed for the second encoder in accordance with the compressed video signal obtained through the compressive encoding by the first encoder. The compressed video signal obtained by the second encoder is recorded on a recording medium.

2 Claims, 6 Drawing Sheets

FIG. 4

| PARAMETER | CONTENT | VARIABLE RANGE |
|---|---|---|
| FILTER COEFFICIENT | BAND ADJUSTMENT FOR THE FILTER 21 | SWITCHING OVER OF FOUR KINDS OF FILTER COEFFICIENTS |
| MB_Type | PRESENCE/ABSENCE OF ESTIMATED ENCODING PROCESS FOR THE MOTION COMPENSATION BY THE MOTION COMPENSATION CIRCUIT 22 | SWITCHING OVER OF INTRA OR NON_INTRA |
| Bit_Rate | ADJUSTMENT OF THE MINIMUM ALLOCATION RATE ALLOCATED TO ONE FRAME PROCESS OF THE MOTION COMPENSATION CIRCUIT 22 | FIVE-STAGED SWITCHING OVER : 1/8, 1/4, 1/3, 1/2, AND 1 |
| MATRIX | ADJUSTMENT OF COEFFICIENT FOR TRANSFORMATION WEIGHTING IN THE DISCRETE COSINE TRANSFORMER 23 | SWITCHING OVER OF THE FOUR KINDS OF MATRIX COEFFICIENTS |
| Q | ADJUSTMENT OF THE QUANTIZATION STEP NUMBERS IN THE DISCRETE COSINE TRANSFORMER 23 | ONE STEP SWITCHING OVER FROM ONE TO 31 |

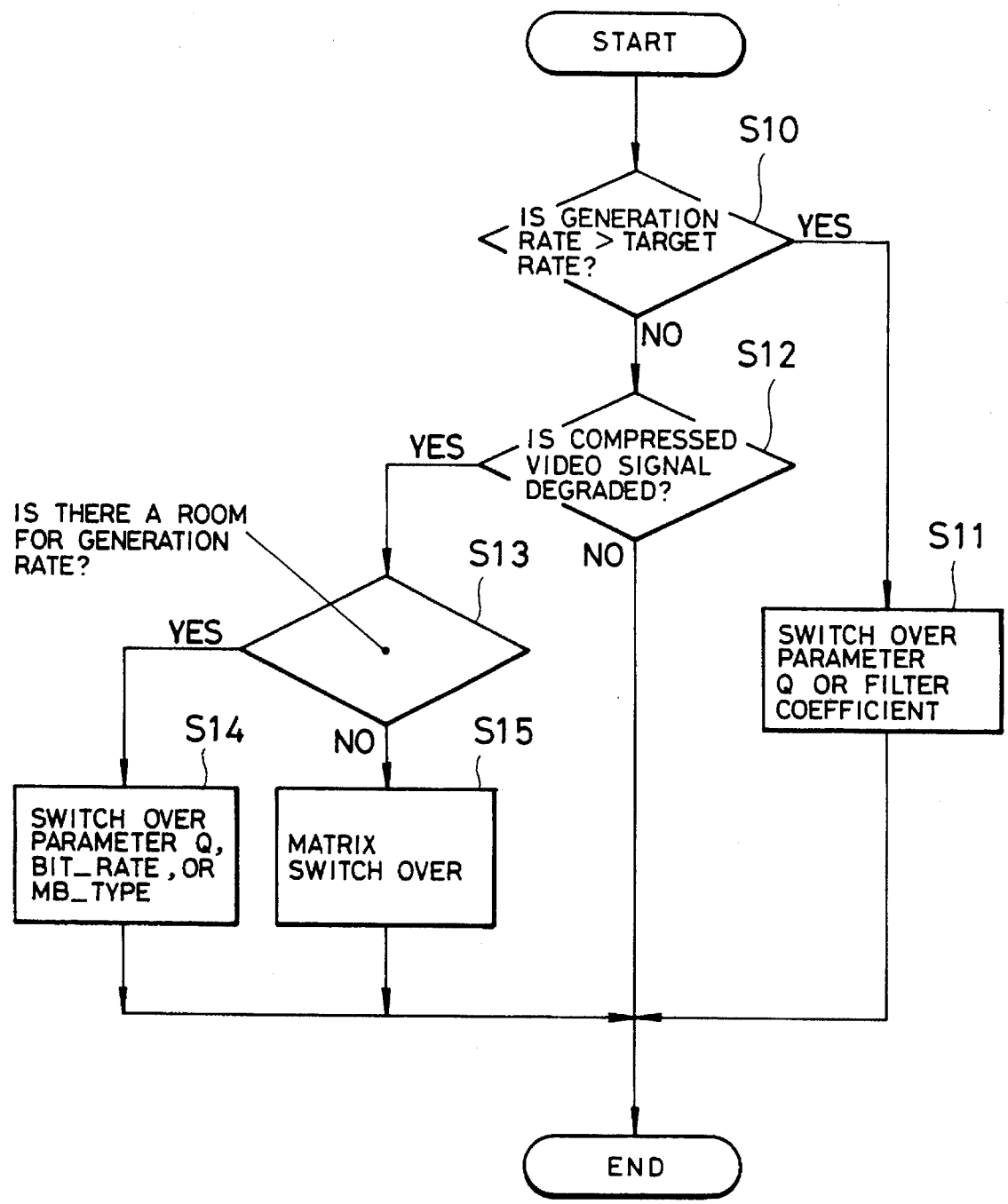

FIG.6

| PARAMETER / GENERATION RATE | FILTER COEFFICIENT | MB_TYPE | BIT_RATE | MATRIX | Q |
|---|---|---|---|---|---|
| STILL A ROOM IN TARGET RATE | — | SET INTR_MB TYPE | LARGE GAIN | — | SMALL |
| NO ROOM IN TARGET RATE | — | — | — | SET HIGH-RANGE INCREMENT | — |
| TARGET RATE OVER | SET "NARROW BAND" | — | — | — | LARGE |

REAL-TIME IMAGE COMPRESSION PROCESSOR

BACKGROUND OF THE INVENTION

1. Field of the Invention

This invention relates to an image compression processor for executing a compression processing for image information. More particularly, the invention relates to a real-time image compression processor for executing an image compression processing in real time in order to record the image information on a recording medium.

2. Description of the Related Background Art

As a system for compressing a video signal representing image information, there is known a real time image compression system which obtains a compressed video signal by executing, in real time, the compression processing of the video signal being reproduced from a VTR (video tape recorder) or the like.

As an example of such system, there is one wherein the compressed video signal is generated by compressively encoding the digital video signal which is reproduced from a VTR in accordance with the MPEG system, and then, the compressed video signal is transformed into the data format of a CD by a formatter thus obtained in order to record it on the CD consecutively. Since the recording rate of information data on a CD is constant, the parameters for the compression processing are set at a compression rate having a sufficient room so that the rate of generation of the recording signal will not exceed the recording rate even when the compressed video signal is produced in accordance with the video signal carrying complicated images.

Therefore, in the conventional real-time image compression processor, various parameters are determined for the encoder in anticipation of processing video signals which should carry a large amount of information. As a result, the compression processing is often carried out at a compression rate which is higher than the necessary rate in such a case where the objective video signal carries a comparatively small amount of information, thereby inviting a problem that the resultant image quality is degraded. Further, when the compressed video signal is obtained in accordance with the video signal whose amount of information is comparatively small, it is inevitable that the signal generation rate also becomes comparatively small against the recording rate. To counteract this, it is practiced that recording is made on a CD by adding null data subsequent to the video data. Here, a problem is again caused that the recording efficiency is lowered because such null data as irrelevant to image data must be recorded additionally.

OBJECTS AND SUMMARY OF THE INVENTION

This invention has been made to solve the problems described above. It is an object of the invention to provide a real-time image compression processor capable of recording on a CD and other recording media the compressed video signal which is compressively processed at a high recording efficiency while preventing the image quality from being degraded, at the time of the reproduction of the video signal from a VTR.

The real-time image compression processor according to this invention comprises a first encoder for obtaining a first compressed video signal by compressively encoding a video signal; delay means for obtaining a delayed video signal by delaying the video signal for a given period of time; a second encoder for obtaining a second compressed video signal by compressively encoding the delayed video signal; a recording apparatus for recording the second compressed video signal on a recording medium; and parameter adjustment means for adjusting the compression parameters for the second encoder on the basis of the first compressed video signal.

According to the invention, there are provided a first encoder for compressively encoding a video signal, and a second encoder for compressively encoding the signal which is obtained by delaying the video signal for a given period of time. On the basis of the compressed video signal obtained by compressively encoding the signal by means of the first encoder, the parameters for the second encoder are adjusted, and then, the compressed video signal obtained by the second encoder is recorded on a recording medium.

BRIEF DESCRIPTION OF THE DRAWINGS

FIG. 4 is a list showing the parameters of an encoder 14 and the contents of their adjustment;

FIG. 5 is a flowchart showing the operation of a real-time image compression processor according to this invention; and FIG. 6 is a list showing the manner of the parameter adjustment operation for the real-time image compression processor according to this invention.

DETAILED DESCRIPTION OF THE PREFERRED EMBODIMENTS

Before describing a real-time image compression processor according to this invention, the description will be made of a conventional processor with reference to the accompanying FIGS. 1 and 2.

Figure 1:
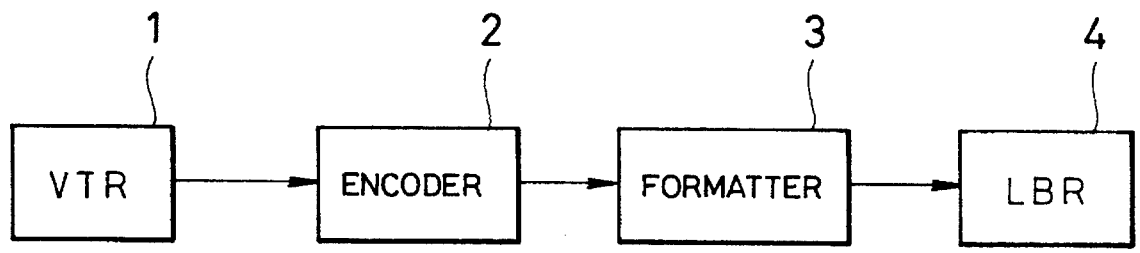
FIG. 1 is a view showing the structure of a conventional real-time image compression processor.

FIG. 1 is a view showing the structure of a conventional example of the real-time image compression processor in which the video signal reproduced from a VTR is compressively processed by a real-time image compression processing system while the signals being reproduced in real time, and then, the compressed video signal thus obtained is recorded on a CD (compact disc) serving as a recording medium.

Figure 2:
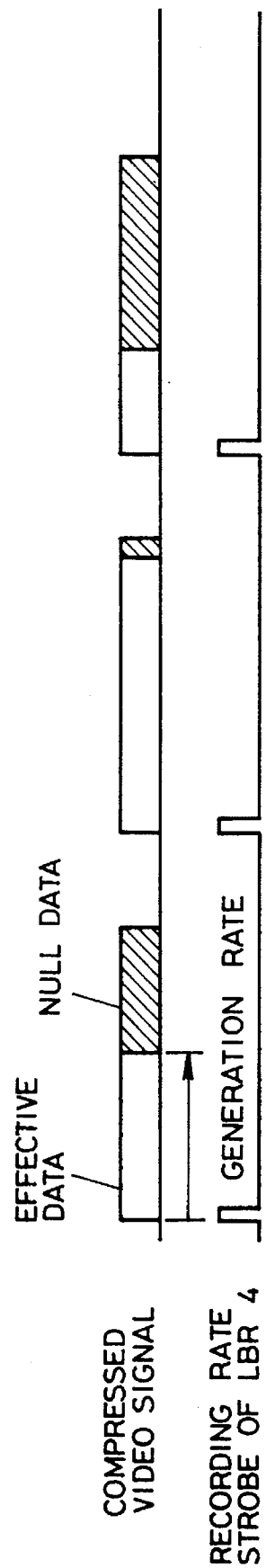
FIG. 2 is a view showing the generation rate of the compressed video signal by the processor shown in FIG. 1, and the recording rate of a laser beam recorder 4.

In FIGS. 1 and 2, the digital video signal reproduced from a VTR 1 is supplied to an encoder 2. The encoder 2 compressively encodes the digital video signal in accordance with the MPEG (Motion Image coding Expert Group) system conforming to ISO 11172, for example, and supplies the compressed video signal thus obtained to a formatter 3. For the compressive encoding of a video signal executed by a system of the kind, an estimated encoding is applied in combination with motion compensation, discrete cosine transformation (DCT), and the like. The compressive encoding is performed at a given compression rate by setting various parameters in advance. The formatter 3 transforms the compressed video signal supplied from the encoder 2 into the data format of a CD, and supplies it to a laser beam recorder (LBR) 4. The laser beam recorder 4 records on the CD one after another the compressed video signal transformed into the format by the formatter 3.

In this case, the rate is constant for recording information data on the above-mentioned CD (the number of data bits usable for one portion of the image frame, for instance). Therefore, it is necessary for the encoder 2 to execute the compression processing so that the generation rate of the compressed video signal which is compressively encoded will not exceed such a constant recording rate irrespective of the image quality of the video signal reproduced by the VTR 1. Consequently, for such an encoder 2, various parameters should be prepared in advance to make its compression rate sufficient enough so as to enable the compression processing to be executed in a condition that the generation rate of the compressed video signal which is obtained on the basis of the video signal carrying complicated images can reside within the range of the recording rate. As a result, according to such parameter preparation, the generation rate of the compressed video signal obtained with respect to the video signal having a comparatively small amount of information becomes comparatively small against the above-mentioned recording rate, inevitably. In such a case, therefore, it is practiced that the null data are added as shown in FIG. 2 when the compressed video signal is recorded on the CD.

As described above, in such real-time image compression processor, the various parameters for the encoder are defined in anticipation of processing video signals carrying a large amount of information. Hence a problem is encountered that the quality is inevitably degraded for the image which is formed by a comparatively small amount of information because the compression processing is still required to be executed at a compression ratio which is more than necessary. Also, as shown in FIG. 2, the null data irrelevant to image information should be recorded additionally, thus causing another problem that the recording efficiency is lowered.

Figure 3:
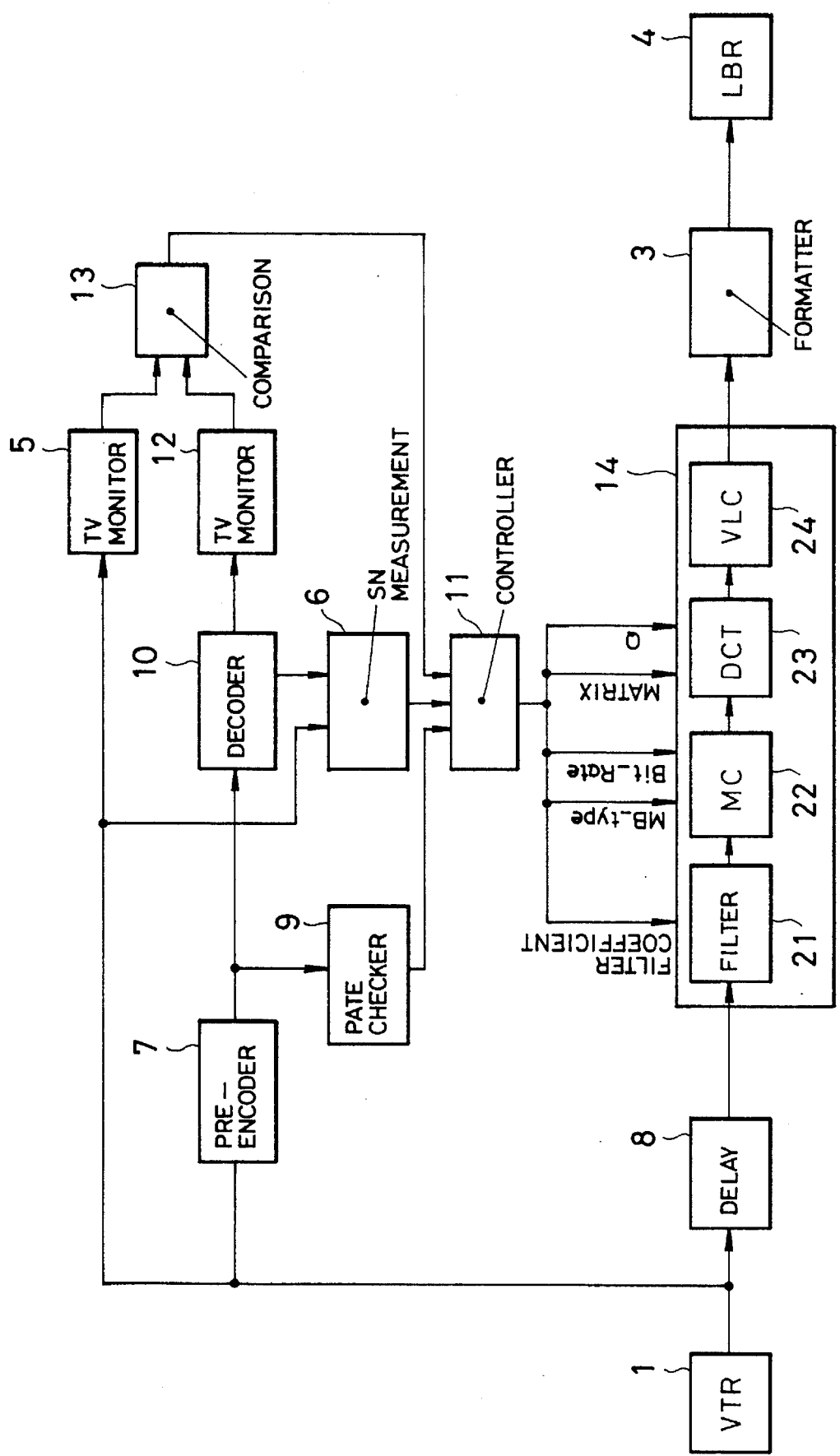
FIG. 3 is a view showing the structure of a real-time image compression processor according to this invention.

FIG. 3 is a view showing the structure of a real-time image compression processor according to this invention.

In FIG. 3, a video signal reproduced from a VTR 1 is supplied to a TV (television) monitor 5, S/N measurement circuit 6, pre-encoder 7, and delay circuit 8, respectively. The pre-encoder 7 compressively encodes image information in accordance with the MPEG system conforming to ISO 11172. In the pre-encoder 7, the bandwidth of the video signal reproduced from the VTR 1 is at first limited to a bandwidth which is set in advance, and a motion compensation is performed in accordance with the video signal whose bandwidth is thus limited. Then, after a DCT is executed for the video signal to which motion compensation is performed, the coefficient value thereof after this transformation is quantized using a predetermined number of quantization steps. Next, the signals thus quantized is encoded in variable length, and is supplied to a rate checker 9 and a decoder 10, respectively. The pre-encoder 7 executes the above-mentioned compression processing in accordance with each of the predetermined parameters for the compressing process. Here, in the pre-encoder 7, initial parameters are defined on the basis of the video signal of a natural image on the average so that the compression rate can be set at a comparatively higher value. The rate checker 9 obtains the generation rate (data bit numbers in one portion of image frame, for instance) of such compressed video signal, and supplies it to a controller 11. The decoder 10 demodulates the compressed video signal which has been compressively encoded by the pre-encoder 7, and supplies the demodulated video signal to the S/N measurement circuit 6 and the TV (Television) monitor 12, respectively.

The S/N measurement circuit 6 measures the S/N of the video signal reproduced from the VTR 1, and the S/N of the video signal demodulated by the decoder 10, respectively, and obtains the degree of degradation of the S/N value of the demodulated video signal with respect to the S/N of the video signal reproduced from the VTR 1. For example, the video signal reproduced from the VTR 1 is compared with the demodulated video signal by the decoder 10 to obtain a differential value between these video signals, and supplies it to the controller 11 as an S/N degradation signal.

The TV monitor 5 executes the image display based on the video signal reproduced from the VTR 1. The TV monitor 12 executes the image display on the basis of the video signal demodulated by the decoder 10.

An image comparator 13 compares each of the displayed images of the TV monitors 5 and 12, and obtains the degree of degradation of the displayed image on the TV monitor 12 with respect to the displayed image on the TV monitor 5 (the extent to which the image is distorted in blocks, for instance), thus supplying to the controller 11 an image degradation signal corresponding to the degree of the image degradation.

The controller 11 is formed by a microcomputer and others, for example. In accordance with the information regarding the generation rate, the S/N degradation signal, and the image degradation signal supplied from the above-mentioned rate checker 9, S/N measurement circuit 6, and image comparator 13, respectively, the controller 11 adjusts each of the compression parameters for the encoder 14 as shown in FIG. 4. For the encoder 14, each of the parameters is at first initialized by the same compressive parameter coefficients as those for the pre-encoder 7 described above. The values set for the initial parameters are modified in response to the parameter adjustment control by the controller 11 as described above.

The delay circuit 8 is formed by a frame memory, for example. This circuit delays the video signal reproduced from the VTR 1 by a period of "the processing time of the pre-encoder 7+the time required for the encoder 14 to modify the above-mentioned parameters", and supplies it to the encoder 14.

The encoder 14 is of the same structure as the pre-encoder 7 with the exception of the aspect where this encoder can modify the set values of the compression parameters. The encoder comprises each of the modules of a filter 21, a motion compensation (MC) circuit 22, a discrete cosine transformer (DCT) 23, and a variable length coder (VLC) 24.

The encoder 14 compressively processes the video signal supplied from the delay circuit 8 in accordance with each of the parameters currently set, and supplies the compressed video signal thus obtained to the formatter 3. The formatter 3 transforms the compressed video signal supplied from the encoder 14 into the data format for a CD, and supplies it to the laser beam recorder (LBR) 4. The laser beam recorder 4 records the compressed video signal formatted by the formatter 3 on the CD consecutively.

As described above, in a real-time image compression processor of the kind, a structure is arranged so that the video signal reproduced by a VTR 1 is supplied to the pre-encoder 7 serving as a first encoder, and then, the video signal is supplied to the encoder 14 serving as a second encoder after being delayed in a given period of time. The structure is further arranged to adjust the compression parameters for the encoder 14 in accordance with the compressed video signal obtained by the compression processing in the above-mentioned pre-encoder 7, and then, to record the compressed video signal obtained by the encoder 14 on a CD or other recording media.

Now, the description will be made of the operation of the real-time image compression processor according to this invention.

FIG. 5 is a flowchart showing the outline of the parameter adjustment control to be executed by the controller 11.

At first, the controller 11 detects the generation rate of the compressed video signal obtained by the pre-encoder 7 through the rate checker 9, and then, determines whether the detected generation rate is larger or smaller than the recording rate of a CD serving as a recording medium (hereinafter referred to as a target rate) (step S10).

At step S10, if it is found that the generation rate is larger than the target rate, the controller 11 adjusts the parameter "Q" of the various parameters for the encoder 14 shown in FIG. 4 by making the generation rate of the compressed video signal smaller so as to set it within the range of the target rate (step S11). In other words, the controller 11 modifies the initially set value of the parameter "Q" to a larger value in order to make the number of quantizing steps of the discrete cosine transformer 23 in the encoder 14 smaller than the initially set number of quantizing steps thereof. By the execution of step S11, the number of quantizing steps in the discrete cosine transformation process by the discrete cosine transformer 23 in the encoder 14 is reduced. As a result, the generation rate itself of the compressed video signal obtainable from the encoder 14 is made smaller to the extent that the number of quantizing steps is reduced.

Also, at the above-mentioned step S11, it is arranged to adjust the parameter "Q" of the various parameters for the encoder 14 shown in FIG. 4, but it may be possible to adjust the "filter coefficient" of the parameters shown in FIG. 4 (step S11). At this time, the controller 11 adjusts the "filter coefficient" of the parameters for the encoder 14 in order to make the band of the filter 21 in the encoder 14 narrower than its initially set band. By this adjustment operation, the amount of information of the video signal is reduced when supplied to the discrete cosine transformer 23 through the filter 21 and the motion compensation circuit 22. Hence the generation rate of the compressed video signal obtainable finally in the encoder 14 is reduced to the extent that the amount of information is reduced. After the completion of the adjustment operation for the encoder 14 at step S11, the video signal reproduced by the VTR 1 is supplied to the encoder 14 through the delay circuit 8.

As described above, when the generation rate of the compressed video signal obtained by the pre-encoder 7 is greater than the target rate, the parameters for the encoder 14 are adjusted before the video signal reproduced by the VTR 1 is supplied to the encoder 14 so that the generation rate of the compressed video signal after the compression processing can be kept within the range of the target rate.

Now, at step S10, if the generation rate is not found to be larger than the target rate, the controller 11 determines whether or not the video signal demodulated by the decoder 10 is degraded more than a predetermined value with respect to the video signal before the compression processing in accordance with the S/N degradation signal and image quality degradation signal supplied from the S/N measurement circuit 6 and the image comparator 13, respectively (step S12). At step S12, if the degradation is found to be degraded more than predetermined, the controller 11 determines whether or not the above-mentioned generation rate still has room with respect to the target rate (step S13).

In the step S13, the generation rate is found to have room with respect to the target rate, the controller 11 adjusts the parameter "Q" of the various parameters for the encoder 14 shown in FIG. 4 in order to increase the generation rate of the compressed video signal (step S14). In other words, the controller 11 modifies the initially set value of the parameter "Q" to a smaller value in order to make the number of quantizing steps of the discrete cosine transformer 23 in the encoder 14 larger than the initially set the number of quantizing steps thereof. By the execution of the step S14, the number of quantizing steps of the discrete cosine transformer 23 in the encoder 14 is increased when the discrete cosine transformation is processed. As a result, the generation rate itself of the compressed video signal obtainable from the encoder 14 is made larger to the extent that the number of quantizing steps is increased.

Also, in the above-mentioned step S14, the parameter "Q" of the various parameters for the encoder 14 shown in FIG. 4 is adjusted, but it may be possible to adjust the "Bit_Rate" of the parameters shown in FIG. 4 (Step S14). In this case, the controller 11 adjusts the "Bite_Rate" of the parameters for the encoder 14 in order to make larger the minimum data allocation rate allocated to the one frame processing of the motion compensation circuit 22 in the encoder 14 than the allocation rate initially allocated. By this adjustment operation, the number of quantizing steps is increased in the one frame processing of the discrete cosine transformer 23. Thus the generation rate of the compressed video signal can be increased in the encoder 14 when it is finally obtained in it.

Further, at the above-mentioned step S14, it may be possible to adjust the parameter "MB_Type" of the various parameters for encoder 14 as shown in FIG. 4 (step S14). In this case, the controller 11 sets this parameter "MB_Type" in an INTRA_MB type for the purpose of stopping the estimated coding processing for the motion compensation in the motion compensation circuit 22 in the encoder 14. By this setting operation, the motion compensation circuit 22 is disabled to execute any motion compensation. As a result, the generation rate can be increased when the compressed video signal is finally obtained in the encoder 14.

After the completion of the adjustment operation of the encoder 14 at step S14, the video signal reproduced by the VTR 1 is supplied to the encoder 14 through the delay circuit 8.

As described above, when the generation rate of the compressed video signal obtained by the pre-encoder 7 still has a room with respect to the target rate, the parameter adjustment for the encoder 14 is executed before the video signal reproduced by the VTR 1 is supplied to the encoder 14 so that the generation rate is increased for the compressed video signal obtainable by the encoder 14 to make the image quality better.

Now, in the above-mentioned step S13, if it is found that the generation rate is not sufficient enough with respect to the target rate, the controller 11 adjusts the parameter "MATRIX" of the various parameters for the encoder 14 as shown in FIG. 4 in order to make the image quality better without increasing the generation rate of the compressed video signal (step S15). In other words, the controller 11 modifies the initially set coefficient of the parameter "MATRIX" in order to make smaller the weight of the DCT coefficient on the higher bound side in the discrete cosine transformer 23 in the encoder 14. By the execution of the step S15, it becomes possible for the discrete cosine transformer 23 in the encoder 14 to process the discrete cosine transformation where the high frequency component is reduced. As a result, the encoder 14 can generate the compressed video signal having an excellent image quality without increasing the generation rate.

After the completion of the adjustment operation of the encoder 14 in the step S15, the video signal reproduced by the VTR 1 is supplied to the encoder 14 through the delay circuit 8.

As described above, when the generation rate of the compressed video signal obtained by the pre-encoder 7 is not sufficient enough with respect to the target rate, the parameter adjustment for the encoder 14 is executed before the video signal reproduced by the VTR 1 is supplied to the encoder 14 in order to make the image quality better without increasing the generation rate of the compressed video signal to be obtained by the encoder 14.

FIG. 6 is a list showing the parameter adjustment operations in the flow described above.

In this respect, a mark "-" in FIG. 6 designates the indefinite adjustment location where an appropriate adjustment is carried out according to its design.

As described above, in the real-time image compression processor according to the present invention, a structure is arranged so that the video signal reproduced by a VTR is supplied to a first encoder, and then, the video signal is supplied to a second encoder after being delayed in a given period of time. The structure is further arranged to adjust the compression parameters for the second encoder in accordance with the compressed video signal obtained by the compression processing in the above-mentioned first encoder, hence recording the compressed video signal obtained by the second encoder on a recording medium. With these structures, therefore, the above-mentioned second encoder executes the parameter adjustment appropriately in accordance with the condition of the compression processing of the compressed video signal obtained by the first encoder before the video signal reproduced by the VTR is supplied.

Consequently, according to the real-time image compression processor of this invention, it is possible to record on a CD or other recording media the compressed video signal which is compressively processed in a high recording efficiency in real time as the reproduction operation by the VTR while preventing the image quality from being degraded.

What is claimed is:

1. A real-time image compression processor comprising:
   a first encoder for obtaining a first compressed video signal by compressively encoding a video signal;
   delay means for obtaining a delayed video signal by delaying said video signal for a given period of time;
   a second encoder for obtaining a second compressed video signal by compressively encoding said delayed video signal;
   a recording apparatus for recording said second compressed signals on a recording medium; and
   parameter adjustment means for adjusting the compression parameters for said second encoder in accordance with said first compressed video signal, said parameter adjustment means comprising:
      rate checking means for detecting the generation rate of said first compressed video signal;
      a decoder for obtaining a demodulated video signal by demodulating said first compressed video signal;
      means for measuring S/N for measuring an S/N ratio of said video signal and said demodulated video signal, respectively, and generating an S/N degradation signal corresponding to the degree of the S/N degradation of said demodulated video signal with respect to said video signal;
      first image display means for reproducing image on the basis of said video signal;
      second image display means for reproducing image on the basis for said demodulated video signal;
      means for comparing images by comparing the displayed images on said first and second image display means, respectively, to generate an image quality degradation signal corresponding to the degree of degradation of the image quality of the displayed image by said second image display means against that of the displayed image by said first image display means; and
      a controller for adjusting the compression parameters for said second encoder in response to at least one of said generation rate, said S/N degradation signal, and said image quality degradation signal.

2. The real-time image compression processor according to claim 1, wherein each of said first and second encoders executes a compression processing through same steps of compression processing, and is initialized in advance with same compression parameters.

* * * * *